US006861018B2

United States Patent
Koyama et al.

(10) Patent No.: US 6,861,018 B2
(45) Date of Patent: Mar. 1, 2005

(54) TEMPERATURE CONTROL METHOD AND APPARATUS FOR INJECTION MOLDING STRUCTURE

(75) Inventors: Hideki Koyama, Fujiyoshida (JP); Takatoshi Kawamura, Yamanashi (JP); Hiromasa Otake, Mishima (JP)

(73) Assignee: Fanuc LTD, Yamanashi (JP)

(*) Notice: Subject to any disclaimer, the term of this patent is extended or adjusted under 35 U.S.C. 154(b) by 255 days.

(21) Appl. No.: 10/223,474

(22) Filed: Aug. 20, 2002

(65) Prior Publication Data

US 2003/0047828 A1 Mar. 13, 2003

(30) Foreign Application Priority Data

Sep. 10, 2001 (JP) ........................................ 2001-272980

(51) Int. Cl.[7] ............................................. B29C 45/78
(52) U.S. Cl. ..................................... 264/40.6; 425/143
(58) Field of Search ........................ 264/40.6; 425/143, 425/144

(56) References Cited

U.S. PATENT DOCUMENTS

| 4,649,262 | A | * | 3/1987 | Yoshikawa | .................. | 425/144 |
| 5,355,938 | A | * | 10/1994 | Hosoya et al. | .............. | 425/144 |
| 5,397,515 | A | * | 3/1995 | Searle et al. | ............... | 264/40.6 |
| 5,411,686 | A | * | 5/1995 | Hata | ......................... | 264/40.6 |
| 5,456,870 | A | * | 10/1995 | Bulgrin | ..................... | 264/40.6 |
| 5,853,631 | A | * | 12/1998 | Linehan | ..................... | 264/40.6 |
| 6,529,796 | B1 | * | 3/2003 | Kroeger et al. | ............. | 425/144 |

FOREIGN PATENT DOCUMENTS

| JP | 07132543 | 5/1995 |
| JP | 11-58481 | 3/1999 |
| JP | 11058481 | 3/1999 |
| JP | 2003-48240 | 2/2003 |

OTHER PUBLICATIONS

L. Billmann, et al., "Temperaturen an Kunststoffverarbeitungsmachinen Adaptive Regein", Kunststoffe, Carl Hansewr Verlag. Munchen, DE, vol. 81, No. 8, Aug. 1, 1991.
L. Billmann, et al., "Adaptive PID–Regler Fur Thermische Prozesse", Automatisierungstechnische Praxis–ATP, Oldenbourg Verlag., Munchen, DE, vol. 31, No. 7, Jul. 1, 1989.
Marschall, "Adaptive Temperaturregler Und Integrierte Steuerungssystem MIT Bildschirmbedienoberflaeche", Kunststoffberater, Kunststoff Verlag., Isernhagen, DE, vol. 35, No. 7/8, Jul. 1990.
Japanese Office Action, Serial No. 2001–272980, Mailed Feb. 3, 2004.

* cited by examiner

*Primary Examiner*—Jill L. Heitbrink
(74) *Attorney, Agent, or Firm*—Staas & Halsey LLP

(57) ABSTRACT

Heat-up characteristics are obtained individually for a plurality of heat zones of an injection molding machine. A heat-up time is obtained from the heat-up characteristic of each heat zone and the difference between a preset temperature and an actual temperature. A heat zone that requires the longest heat-up time is specified. Heat-up of each heat zone is controlled in accordance with the longest heat-up time.

5 Claims, 8 Drawing Sheets

| ZONE | MEASURED TEMPERATURE CHANGING RATE | DEAD TIME | HEAT-UP STARTING TEMPERATURE | PRESET TEMPERATURE | TEMPERATURE DIFFERENCE | CONTROL TEMPERATURE CHANGING RATE |
|---|---|---|---|---|---|---|
| Z0 | Ka0 | td0 | Ts0 | To0 | ΔT0 | Kc0 |
| Z1 | Ka1 | td1 | Ts1 | To1 | ΔT1 | Kc1 |
| Z2 | Ka2 | td2 | Ts2 | To2 | ΔT2 | Kc2 |
| ⋮ | ⋮ | | ⋮ | ⋮ | ⋮ | ⋮ |
| Zn | Kan | tdn | Tsn | Ton | ΔTn | Kcn |
| ⋮ | ⋮ | | ⋮ | ⋮ | ⋮ | ⋮ |
| ZN-1 | KaN-1 | tdN-1 | TsN-1 | ToN-1 | ΔTN-1 | KcN-1 |

TB

TEMPERATURE CONTROL METHOD AND APPARATUS FOR INJECTION MOLDING STRUCTURE

BACKGROUND OF THE INVENTION

1. Field of the Invention

The present invention relates to temperature control for a nozzle and a barrel of an injection molding machine.

2. Description of the Prior Art

In starting injection molding operation in an injection molding machine, the respective temperatures of individual zones of a nozzle and a barrel must be raised to target preset temperatures. According to this conventional heat-up method, the preset temperatures are ordered as target values without regard to the heat-up characteristics of the zones of the nozzle and the barrel, and PID (proportional integral differential) control is executed to attain the target preset temperatures.

A zone of the nozzle portion with high watt density can be quickly heated to its target preset temperature. However, zones near the root of the barrel are heated up slowly and take time before their temperatures reach their respective target preset temperatures. Thus, the heat-up times of the zones of the nozzle and the barrel are subject to variation. Accordingly, a molten resin stays for various times in the individual zones before a screw is allowed to rotate after heat-up operation. In consequence, the molten resin stays long in the zone of the nozzle portion that can be quickly heated up, so that it is subject to problems of deterioration, burning, carbonization, etc.

In order to avoid these problems, a novel control method is disclosed in the Japanese Patent Application Laid-Open No. 5-77302. With this method, the start of heating is delayed more for zones with smaller thermal capacities so that the points of time for the attainment of preset temperatures for individual zones are substantially coincident. According to this control method, however, the temperature of the nozzle portion that has a smaller thermal capacity starts to rise later than those of the zones of the barrel do. Thus, the resin that stays in the barrel is decomposed, gasified, and accumulated in the barrel, possibly resulting in explosion.

OBJECT AND SUMMARY OF THE INVENTION

The object of the present invention is to provide a temperature control apparatus and a temperature control method capable of heat-up control such that the respective temperatures heat zones of a nozzle portion and a barrel of an injection molding machine can be raised to their respective target temperatures without any variation in heat-up time.

In order to achieve the above object, a temperature control apparatus for an injection molding machine which has a plurality of heat zones according to the invention comprises means for obtaining and storing the heat-up characteristic of each zone in the injection molding machine when a heater for each heat zone is heated up, means for obtaining a heat-up time from the stored heat-up characteristic of each heat zone and the difference between a preset temperature and the actual temperature of each heat zone, means for extracting a heat zone requiring the longest heat-up time from among the plurality of heat zones, and means for controlling the heat-up of each heat zone in accordance with the heat-up time of the extracted heat zone.

Further, a temperature control method for an injection molding machine which has a plurality of heat zones according to the invention comprises obtaining the heat-up characteristic of each heat zone in the injection molding machine when a heater for each heat zone is heated up, obtaining a heat-up time from the obtained heat-up characteristic of each heat zone and the difference between a preset temperature and the actual temperature of each heat zone, extracting a heat zone requiring the longest heat-up time from among the plurality of heat zones for which the heat-up times have been obtained, and controlling the heat-up of each heat zone in accordance with the heat-up time of the extracted heat zone.

The temperature control apparatus and the temperature control method described above may be specified as follows.

The heat-up characteristic is obtained from the time required for heating-up from a first temperature to a second temperature with a heater always kept ON-state and the difference between the first and second temperatures.

The heat-up characteristic is settled in accordance with a temperature change rate, obtained from the time required for heating-up from a first temperature to a second temperature with a heater kept always ON-state and the difference between the first and second temperatures, and the time interval between the start of the heat-up and the start of actual temperature rise.

Each of the heat zones is subjected to heat-up control such that a target temperature for temperature control is changed to the preset temperature in accordance with a heat-up straight line or heat-up curve obtained from the difference between the preset temperature and the actual temperature and the heat-up time of the extracted heat zone.

Each of the heat zones is subjected to heat-up control such that a target temperature for temperature control is changed to the preset temperature in accordance with a heat-up straight line or heat-up curve based on the difference between the heat-up time thereof and the heat-up time of the extracted heat zone.

Each of the heat zones is subjected to heat-up control such that a target temperature for temperature control is changed to the preset temperature in accordance with a heat-up straight line or heat-up curve based on the difference between the heat-up time thereof and the heat-up time of the extracted heat zone and the time interval between the start of the heat-up and the start of actual temperature rise.

According to the temperature control apparatus and method of the invention, the heat zones of the nozzle portion and the barrel can be heated up to their respective target temperatures in substantially the same manner, so that deterioration, burning, carbonization, etc. of a resin can be prevented from being caused as the heat zones are heated up. Since there is no possibility of heat-up of only some heat zones being delayed, moreover, explosion or the like can be prevented from being caused by reduction of the resin to cracked gas that is attributable to the difference in heat-up time.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
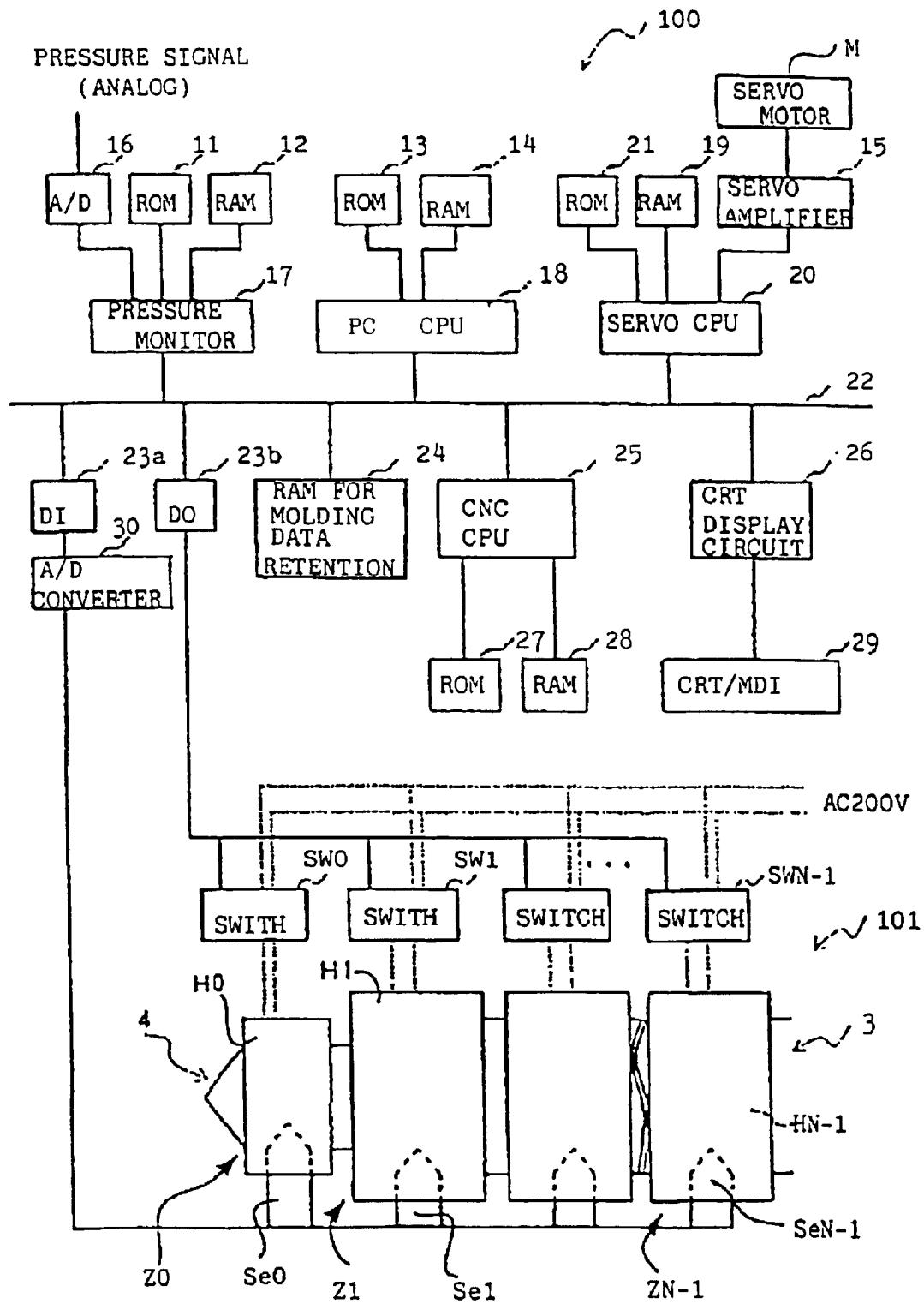
FIG. 1 is a block diagram showing a temperature control apparatus for an injection molding machine according to the invention.

FIG. 1 is a block diagram showing the principal part of an injection molding machine according to one embodiment of the present invention.

A control apparatus 100 comprises a CPU 25 for CNC as a microprocessor for numerical control, a CPU 18 for PC (programmable controller) as a microprocessor for a programmable controller, a servo CPU 20 as a microprocessor for servo control, and a pressure monitoring CPU 17. The CPU 17 samples signals delivered through an A/D converter 16 from sensors that are located on the side of the injection molding machine body and detect various pressures such as the injection pressure. The CPU 17 loads the sampled signals into a RAM 14. Information can be transferred between the microprocessors by selecting reciprocal inputs and outputs by a bus 22.

The CPU 18 for PC is connected with a ROM 13 that is stored with sequence programs for controlling the sequential operation of the injection molding machine and the RAM 14 that is used for temporary storage of operation data and the like. The CPU 25 FOR CNC is connected with a ROM 27 that is stored with automatic operation programs for generally controlling the injection molding machine and a RAM 28 that is used for temporary storage of operation data and the like.

Further, the servo CPU 20 is connected with a ROM 21, which is loaded with a dedicated control program for servo control for processing a position control loop, speed control loop, and current control loop, and a RAM 19 that is used for temporary storage of data. The pressure monitoring CPU 17 is connected with a ROM 11, which is stored with a control program for control by the CPU 17, and a RAM 12 for storing the aforesaid pressures detected by the various sensors. Further, the servo CPU 20 is connected with a servo amplifier 15 for driving servomotors M for various axes for mold clamping, injection, screw rotation, ejector, etc. in response to commands from the CPU 20. Outputs from position-speed detectors (not shown) that are attached to the servomotors M for the individual axes are fed back to the servo CPU 20.

A manual data input unit 29 with display is connected to the bus 22 through a CRT display circuit 26, and serves for the selection of graphic display pictures and function menus and entry of various data. The input unit 29 is provided with ten-keys for numerical data input, various function keys, etc. A liquid crystal display unit may be used.

A RAM 24 for data retention that is formed of a nonvolatile memory is a memory for molding data retention that stores molding conditions and various preset values related to injection molding operation, parameters, macro variables, etc. In connection with the present invention, moreover, heat-up characteristics (average temperature change rate and dead time) for heat zones (mentioned later) are set and stored.

An input circuit 23a and an output circuit 23b are interfaces-for receiving signals from limit switches arranged on various parts of the injection molding machine body and a control panel and transmitting various commands to peripheral apparatuses of the injection molding machine. FIG. 1 shows only those parts which are related to the present invention.

Reference numeral 101 denotes an injection unit portion, in which a barrel 3 is divided into a plurality of zones. Zones Z0, Z1, . . . ZN−1 and a nozzle 4 are provided with heaters H0, H1, . . . HN−1. Preset temperatures are set individually for these zones, and the respective temperatures of the zones Z0, Z1, . . . ZN−1 are kept at the preset values for injection molding. The zones Z0, Z1, . . . ZN−1 of the nozzle portion and the barrel, of which temperatures are controlled to set and maintain the target preset temperature individually, will be referred to as heat zones hereinafter.

The input circuit 23a is supplied with temperature detection signals from temperature sensors Se0, Se1, . . . SeN−1 in the heat zones Z0, Z1, . . . ZN−1 of the barrel 3 through an A/D converter 30. Further, the output circuit 23b is connected with switches SW0, SW1, . . . SWN−1 of the heaters H0, H1, . . . HN−1 for heating the heat zones Z0, Z1, . . . ZN−1.

With this arrangement, the CPU 18 for PC controls the sequential operation of the whole injection molding machine, and CPU 25 FOR CNC distributes movement commands to the servomotors for the individual axes according to running programs of the ROM 27 and the molding conditions stored in the RAM 24 for data retention. The servo CPU 20 performs servo control, such as position loop control, speed loop control, current loop control, etc., thereby executing the so-called digital servo processing in a conventional manner, in accordance with the movement commands distributed to the axes and position and speed feedback signals detected by the position-speed detectors.

The CPU 18 for PC executes PID control in accordance with the target preset temperature set for the heat zones Z0, Z1, . . . ZN−1 and temperatures detected by the temperature sensors Se0, Se1, . . . SeN−1. Further, the CPU 18 for PC controls the on-off operation of the switches SW0, SW1, . . . SWN−1 to supply current to the heaters H0, H1, . . . HN−1, and heats the heat zones Z0, Z1, . . . ZN−1 to the preset temperature.

The configurations and functions described above are not different from those of a control apparatus for a conventional motor-driven injection molding machine. A temperature control apparatus according to the present invention is composed of the control apparatus 100.

In this arrangement, the heat-up characteristics are first obtained and stored for the heaters H0, H1, . . . HN−1 of the nozzle 4 and the barrel 3. These heat-up characteristics are obtained from a time (dead time) elapsed from the supply of current with heaters H0, H1, . . . HN−1 which are being turned on until the start of actual temperature rise with the switches SW0, SW1, ... SWN−1 of the heat zones Z0, Z1, ... ZN−1 turned always on, and a temperature change rate obtained when the degree of temperature rise becomes constant.

Figures 2, 3:
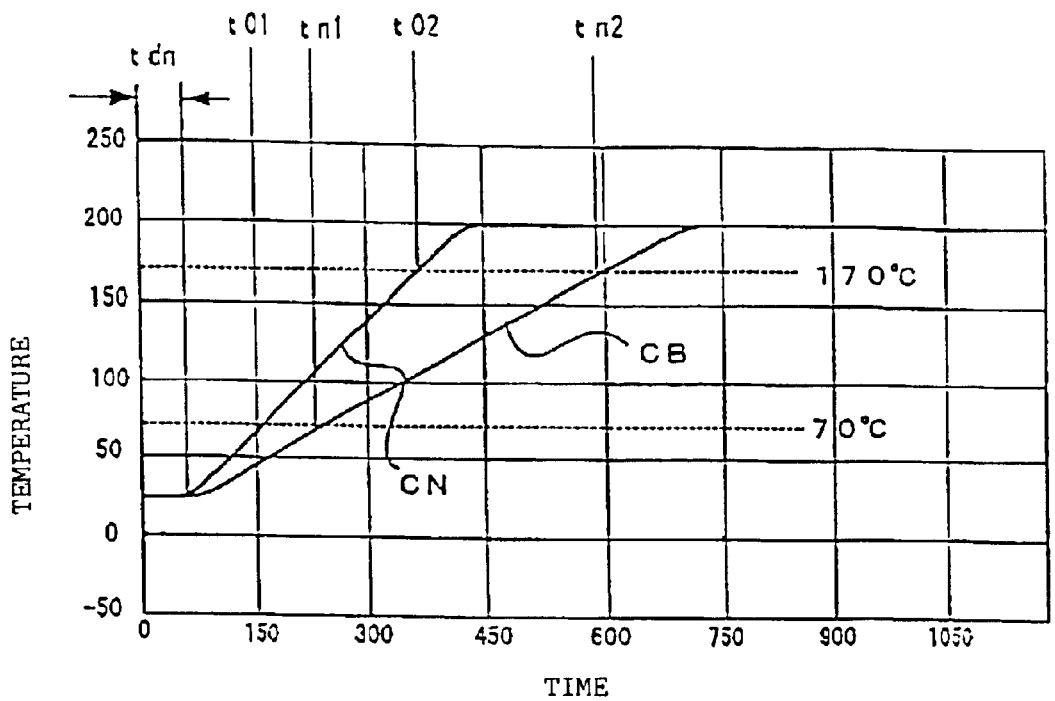
FIG. 2 is a diagram for illustrating the way of obtaining the temperature change rate.
FIG. 3 is a diagram showing a temperature table stored in the temperature control apparatus of FIG. 1.

If the heaters H0, H1, ... HN−1 are heated to target temperature that is much higher than their present temperature, the switches under the on-off control are always in ON-state before the target preset temperature is substantially reached despite the PID control. Let it be supposed that the present temperature of the heaters H0, H1, ... HN−1 is 25° C., and the target temperature is 200° C., as shown in FIG. 2, for example. In FIG. 2, curve CN represents the heat-up characteristic of the nozzle 4 (heat zone Z0), and curve CB represents the heat-up characteristic of the heat zone Zn, one of the heat zones of the barrel 3.

The switches SW0, SW1, ... SWN−1 are turned on to start timing, the detected temperatures from the temperature sensors Se0, Se1, ... SeN−1 are monitored, and the time required before the start of actual temperature rise in each heat zone Zn is obtained as a dead time tdn (td0, td1, ... tdN−1). In an intermediate region, among other heat-up temperature regions, the switches SW0, SW1, ... SWN−1 are always in ON-state, and heat release value of the heater H0 and the temperature rise rate or temperature change rate of the heat zones Z0, Z1, ... ZN−1 are supposed to be fixed. Thereupon, first and second temperatures are set in the intermediate region in a heat-up temperature width (25° C. to 200° C.), time is obtained when those set temperatures are reached, and an average temperature change rate Ka is obtained from the set first and second temperatures and the difference between times required for reaching the set first and second temperatures.

For example, the first and second temperatures in the intermediate region in the heat-up temperature width (25° C. to 200° C.) are adjusted to 70° C. and 170° C., respectively, and times to1, and to2 when reaching the first and second temperatures of 70° C. and 170° C. are read, respectively. Let it be supposed that to1 and to2 are 150 sec and 360 sec, respectively. Thereupon, an average temperature change rate Ka0 for the heat zone Z0 of the nozzle portion is given by Ka0=(170° C.−70° C.)/(360 sec−150 sec)=0.476 (° C./sec).

Likewise, temperature characteristics are also obtained for the heat zones Z0, Z1, ... ZN−1 of the barrel. If the temperature rise curve CB of a certain heat zone Zn of the barrel 3 is the one shown in FIG. 2, and if the times required for reaching 70° C. and 170° C. for the heat zone Zn are tn1=230 sec and tn2=580 sec, respectively, an average temperature change rate Kan for the heat zone Zn is given by Kan=(170° C.−70° C.)/(580 sec−230 sec)=0.286 (° C./sec).

Alternatively, the respective temperatures of the heat zones Z0, Z1, ... ZN−1 may simply be detected by the temperature sensors Se0, Se1, ... SeN−1 and stored with every given period until reaching the preset temperatures, with the switches SW0, SW1, ... SWN−1 turned on. In this case, the stored data or a graphic version of the data is displayed on the display unit 29, and average temperature change rates Ka0, Ka1, ... KaN−1 and dead times td0, td1, ... tdN−1 of the heat zones Z0, Z1, ... ZN−1 are obtained according to the displayed data or graph.

The dead times tdn (td0 to tdN−1) and the temperature change rates Kan (Ka0 to KaN−1) are obtained and stored in this manner. FIG. 3 shows an example of a table TB in the RAM 24 for data retention that is composed of a nonvolatile memory. The table TB stores various data for heat-up temperature control. The temperature change rates and dead times thus measured are stored as temperature change rates Ka0, Ka1, Ka2, ... Kan, ... KaN−1 and dead times td0, td1, td2, ... tdn, ... tdN−1 for the individual heat zones Z0, Z1, ... ZN−1.

In starting heat-up operation, a temperature change rate for control is obtained according to the stored temperature change rates and dead times, and the heat-up temperature is controlled according to this change rate. The principle of heat-up control according to a first embodiment of the invention will be described first.

Let it be supposed that the actual temperature for the start of heat-up operation in the heat zone Zn and the target preset temperature of the zone Zn are Tsn and Ton, respectively. Thereupon, a heat-up temperature difference $\Delta Tn$ is given by $$\Delta Tn = Ton - Tsn. \quad (1)$$

A heat-up time tun can be obtained as follows by adding the dead time tdn of the zone Zn to a value that is obtained by dividing the $\Delta Tn$ by the stored temperature change rate Kan of the heat zone Zn:

$$tun = (\Delta Tn/Kan) + tdn. \quad (2)$$

In expression (2), the dead time tdn may be ignored without being added.

Heat-up times tu0 to tuN−1 for all the heat zones Z0, Z1, ... ZN−1 are obtained, and the longest of these heat-up times is stored as a maximum heat-up time tmax. Temperature change rates Kc0 to KcN−1 for the heat-up control of the heat zones Z0, Z1, ... ZN−1 are obtained by dividing temperature differences $\Delta T0$ to $\Delta TN-1$ between actual temperatures and the target preset temperature for the start of heat-up operation in the heat zones Z0, Z1, ... ZN−1 by the maximum heat-up time tmax:

$$Kcn = \Delta Tn/tmax. \quad (3)$$

A target temperature as a function of time is obtained according to the obtained temperature change rates Kc0 to KcN−1, and is instructed as a target value for PID temperature control. Thereupon, the heat zones Z0, Z1, ... ZN−1 can attain the target temperature substantially at the same time (on passage of the maximum heat-up time tmax).

Figure 4:
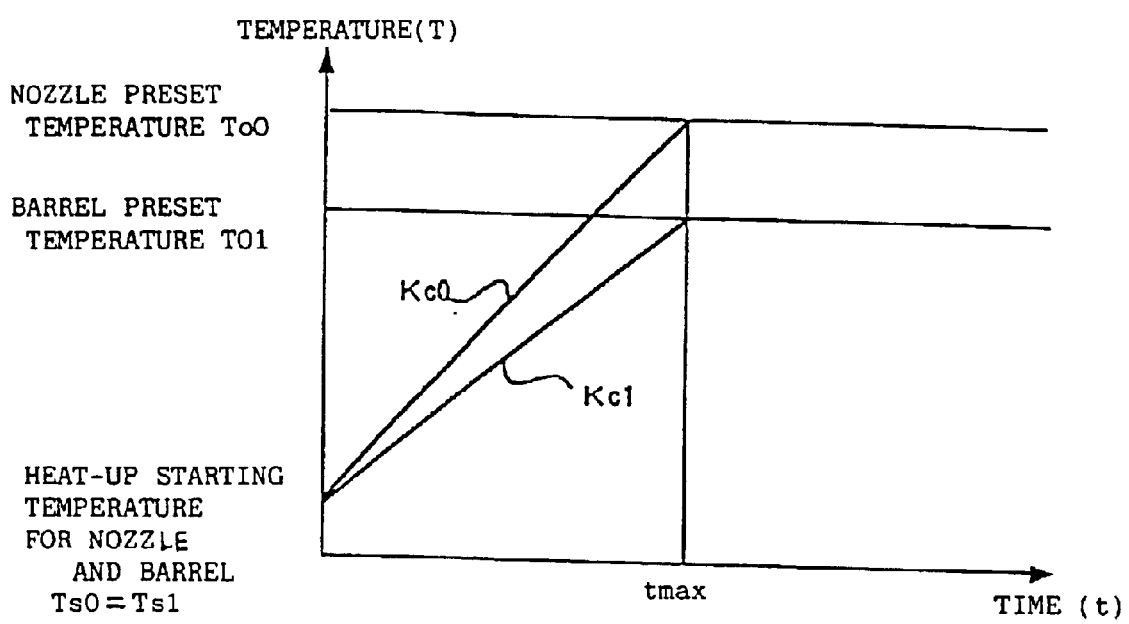
FIG. 4 is a diagram for illustrating heat-up control according to a first embodiment of the invention.

FIG. 4 is a diagram showing heat-up control for the heat zone Z0 of the nozzle portion and the first heat zone Z1 of the barrel. The heat zone Z0 of the nozzle portion and the heat zone Z1 of the barrel share an actual temperature for the start of heat-up operation (Ts0=Ts1). The target preset temperature of the heat zone Z0 of the nozzle portion is To0, while that of the heat zone Z1 is To1. The respective target values of the heat zones Z0 and Z1 for temperature control are outputted and controlled along straight lines that represent the temperature change rates Kc0 and Kc1, respectively. When the maximum heat-up time tmax is reached, their respective target preset temperatures To0 and To1 are instructed to both the heat zones and these heat zones are controlled to these temperatures.

Figure 5:
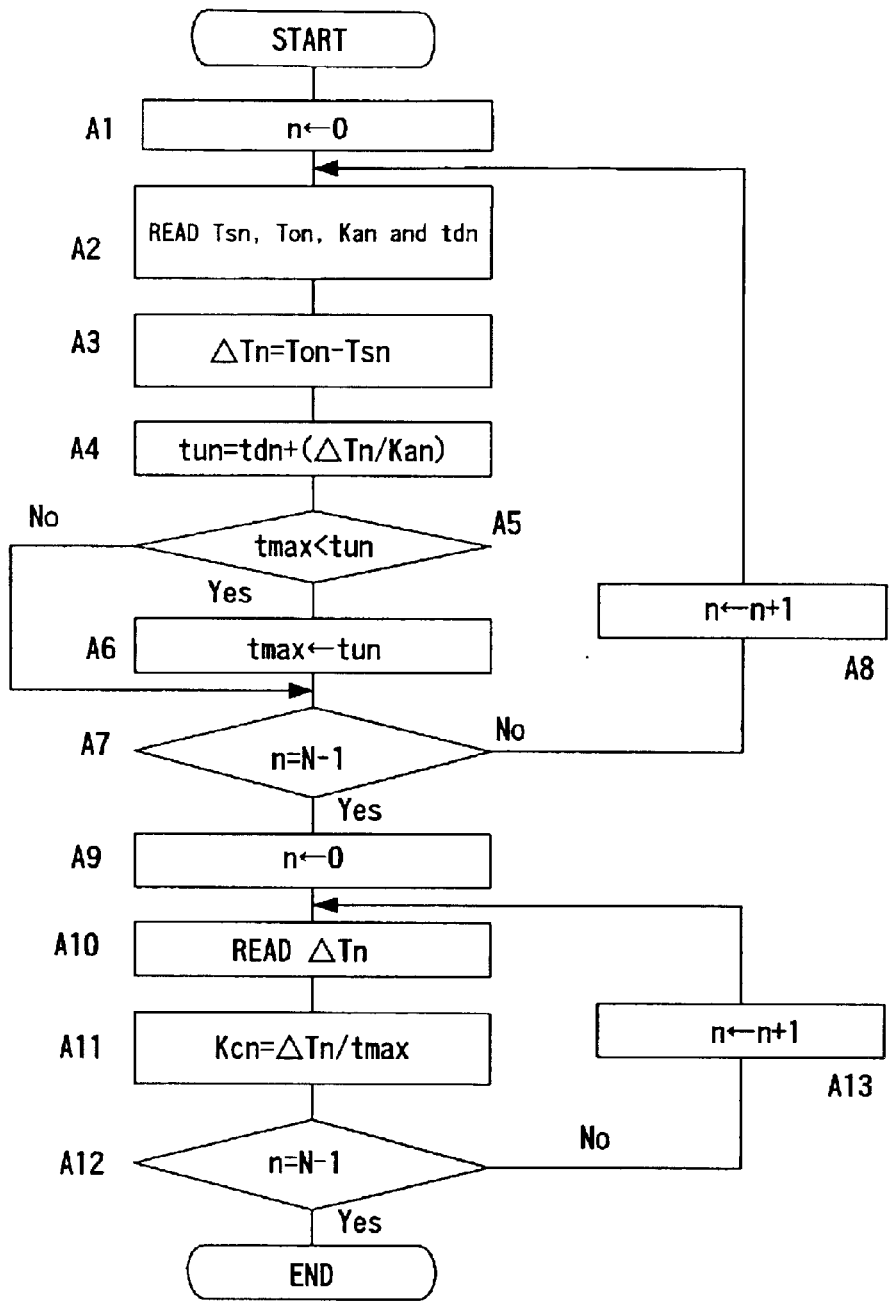
FIG. 5 is a flowchart showing processing for obtaining the control temperature change rate for the heat-up control according to the first embodiment.

FIG. 5 shows processing for obtaining the temperature change rate Kcn for temperature control. The CPU 18 for PC executes this processing when the preset temperatures are set for the individual heat zones Z0, Z1, ... ZN−1.

Let it be supposed first that the temperature characteristics, i.e., the temperature change rates and dead times, of the heat zones Z0, Z1, ... ZN−1 are measured and set as Ka0 to KaN−1 and td0 to tdN−1 in the heat zones Z0, Z1, ... ZN−1, as shown in FIG. 3. Further, the preset temperatures of the heat zones Z0, Z1, ... ZN−1 are supposed to be set as To0 to ToN−1, as shown in FIG. 3.

The CPU 18 for PC sets an index n indicative of the heat zones $Z0, Z1, \ldots ZN-1$ at 0 (Step A1), and reads a detected temperature from a temperature sensor Sen (=Se0) for the heat zone Zn (=Z0) as the actual temperature Tsn (=Ts0) for the start of heat-up. At the same time, the CPU 18 for PC reads the preset temperature Ton (=To0), temperature change rate Kan (=Ka0), and dead time tdn (=td0) stored in the table TB (Step A2). Although the read actual temperature Tsn for the start of heat-up operation need not always be stored in the table TB, FIG. 3 shows the case where it is stored.

Then, the computation of expression (1) is executed in accordance with the read preset temperature Ton and actual temperature Tsn for the start of heat-up operation, and the heat-up temperature or temperature difference ΔTn for the heat zone Zn is obtained and stored in the table TB (Step A3). The computation of expression (2) is executed according to the temperature difference ΔTn, read temperature change rate Kan, and dead time tdn, whereby the heat-up time tun for the heat zone Zn is obtained (Step A4). The dead time tdn is negligible.

Whether or not the obtained heat-up time tun is longer than the maximum heat-up time tmax stored in a register is determined (Step A5). This register is previously stored with "0" when the power is turned on. If the obtained heat-up time tun is longer than the maximum heat-up time tmax stored in the register, the heat-up time tun is stored as the maximum heat-up time tmax in the register (Step A6). If the heat-up time tun is not longer than the maximum heat-up time tmax, the program advances directly to Step A7. In Step A7, whether or not a maximum value N-1 for the heat zones is reached by the index n is determined. If the maximum value N-1 is not reached, the index n is incremented by "1" (Step A8), whereupon the process of Step A2 and the subsequent processes are executed.

When the maximum value N-1 for the heat zones is reached by the index n in consequence, the longest heat-up time tun of the heat zones $Z0, Z1, \ldots ZN-1$ is stored as the maximum heat-up time tmax in the register.

When the maximum value N-1 is reached by the index n, the index n is reset at 0 (Step A9), and the temperature difference ΔTn stored corresponding to the heat zone Zn indicated by the index n is read (Step A10). The computation of expression (3) is executed in a manner such that the temperature difference is divided by the maximum heat-up time tmax, whereby the temperature change rate Kcn for the control of the heat zone Zn is obtained and stored in the table TB (Step A11). Then, whether or not the maximum value N-1 for the heat zones is reached by the maximum heat-up time tmax is determined (Step A12). If the maximum value N-1 is not reached, the index n is incremented by 1 (Step A13), whereupon the processes of Steps A10 to A13 are executed so that the maximum value N-1 for the heat zones is reached by the index n. The processing is finished when the maximum value N-1 is reached. In consequence, the temperature change rates Kc0 to KcN-1 for the control of the individual heat zones $Z0, Z1, \ldots ZN-1$ are stored in the table TB, as shown in FIG. 3.

Figure 6:
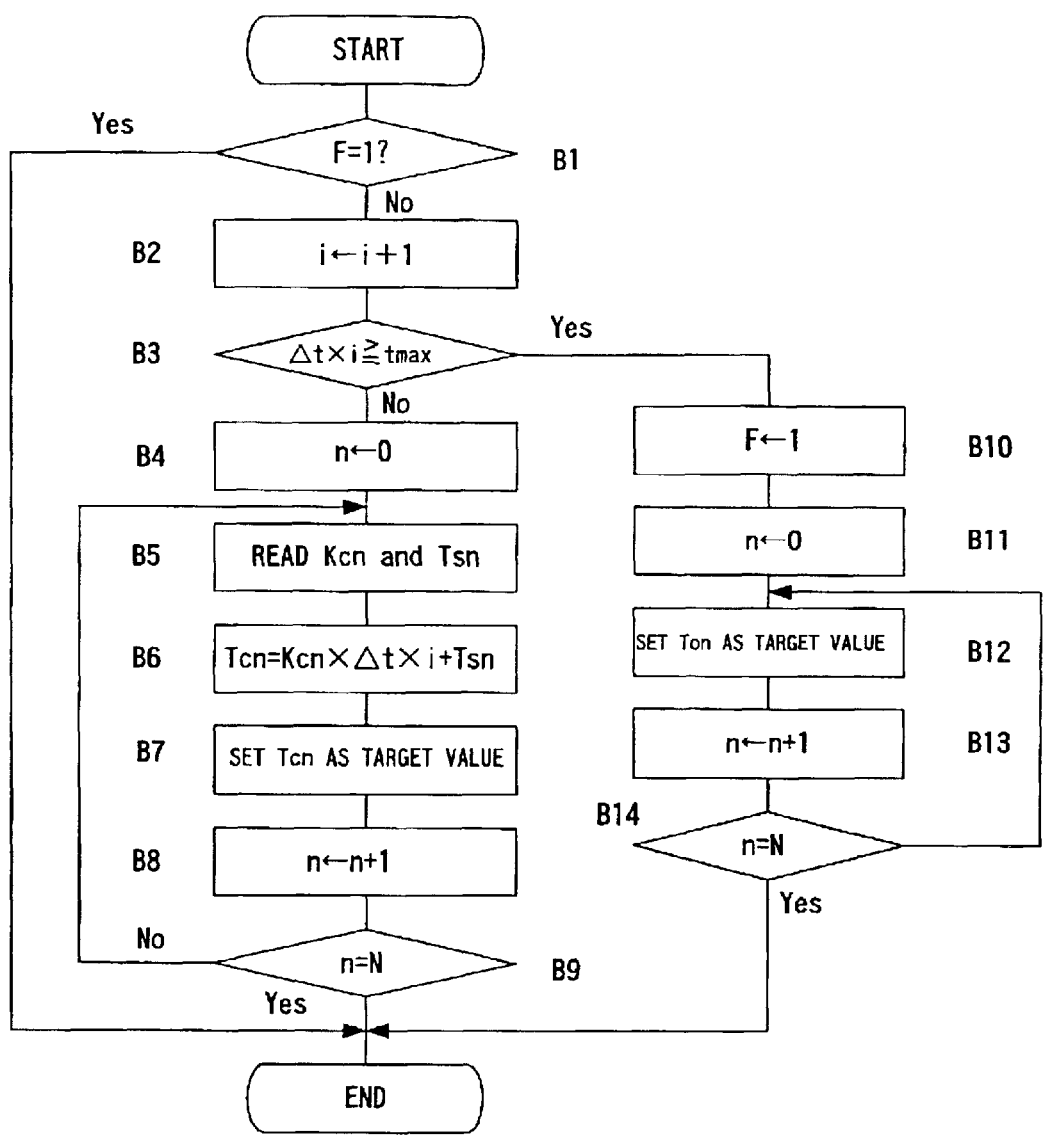
FIG. 6 is a flowchart showing processing for setting a target command value for PID temperature control for the heat-up control according to the first embodiment.

FIG. 6 is a flowchart showing heat-up temperature control processes the CPU 18 for PC executes with every given period Δt when a heat-up start command (temperature control start command) is inputted.

First, whether or not a flag F is set at "1" is determined (Step B1). Since the flag F is initially set at "0", the program advances to the Step B2, whereupon an index i for counting processing frequencies is incremented by "1". This index i is also initially set at "0". Then, the time having elapsed after the start of heat-up operation is obtained by multiplying the index i by the processing period Δt, and whether or not this time is not shorter than the maximum heat-up time tmax is determined (Step B3).

If the time is shorter than the maximum heat-up time tmax, "0" is set for the index n for assigning the heat zone (Step B4), the temperature change rate Kcn for the control of the heat zone Zn indicated by the index n and the actual temperature Tsn at the start of heat-up operation are read from the table TB (Step B5). A target temperature Tcn for the period concerned is obtained by adding the actual temperature Tsn for the start of heat-up operation to the product of the temperature change rate Kcn for control and time (Δt×i) elapsed after the start of heat-up operation. This value is set as the target value for PID temperature control (Steps B6 and B7) as follows:

$$Tcn = Kcn \times \Delta t \times i + Tsn. \quad (4)$$

Then, the index n is incremented by "1". If the index n is smaller the number N of heat zones, the processes of Steps B5 to B9 are executed repeatedly, and target values Tc0 to TcN-1 for PID temperature control are set for the heat zones $Z0, Z1, \ldots ZN-1$, respectively, whereupon the processing for the present period is finished.

Thereafter, the processes of Steps B1 to B9 are executed for each period until the time (Δt×i) elapsed after the start of heat-up operation exceeds the maximum heat-up time tmax. Thus, the target values for PID temperature control are set in the form of a temperature rise straight line based on the temperature change rates Kc0, Kc1, . . . KcN-1 that are set for the heat zones $Z0, Z1, \ldots ZN-1$, respectively, as in the example shown in FIG. 4. The PID temperature control is carried out with use of these target temperatures as command values.

According to the conventional method, the switches SW of the heaters H are always in ON-state during the heat-up operation. According to the present invention, however, the switches are on-off controlled, so that the respective temperatures of the heat zones $Z0, Z1, \ldots ZN-1$ are controlled so as to agree with the target command temperatures. When the maximum heat-up time tmax elapses, the temperature of heat zones $Z0, Z1, \ldots ZN-1$ are controlled so as to reach the preset temperature Ton.

If it is detected that the elapsed time (Δt×i) after the start of heat-up operation is not shorter than the maximum heat-up time tmax (Step B3), the flag F is set at "1" (Step B10), and the index n is set at "0" (Step B11). Thereafter, the index n is incremented by "1" and the preset temperature Ton is set as the target value for PID temperature control for the heat zone n indicated by the index n (Steps B12 and B13). When the index n reaches the number N of heat zones, the processing for the present processing period is finished. Since the flag F is set at "1" in the next and subsequent periods, this target temperature is not set at all, and the PID temperature control is executed thereafter according to the preset temperature Ton set as the target value.

Figure 7:
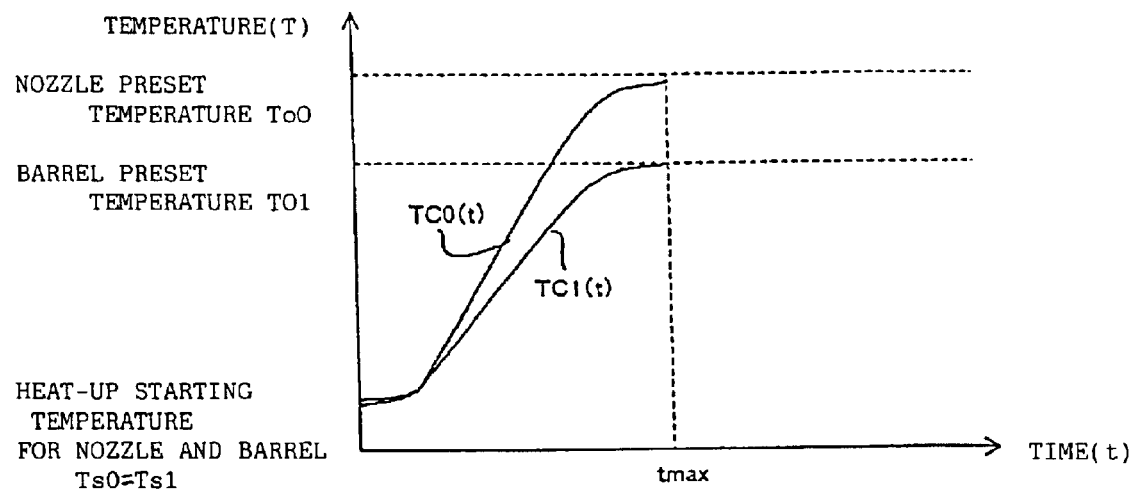
FIG. 7 is a diagram for illustrating heat-up control in a mode different from that of the heat-up control of FIG. 4.

In the embodiment described above, the actual temperature for the start of heat-up operation and the target preset temperature are connected by a straight line as the heat-up straight line, as shown in FIG. 4. As shown in FIG. 7, however, the heat-up straight line may be replaced with a heat-up curve of a function TC(t). In the example shown in FIG. 7, functions TC0(t) and TC1(t) are defined for the heat zone Z0 of the nozzle portion and the heat zone Z of the barrel, respectively. In the case where this heat-up curve is used for the heat-up operation, points (temperatures with respect to time) on heat-up curves TC0(t), TC1(t), . . . are previously stored in a memory for each period Δt for heat-up temperature control shown in FIG. 6, for example. After the start of heat-up operation, the temperatures stored in the memory should be successively read and used as target temperatures for PID temperature control.

In the case of the heat-up operation based on the straight line, as shown in FIG. 4, data on the heat-up straight line may be also previously stored in the memory so that they can be read and instructed as target temperatures.

The following is a description of a second embodiment of the present invention. In this second embodiment, the control temperature change rate for the heat-up of each heat zone is obtained in accordance with the difference from the maximum heat-up time.

Figure 8:
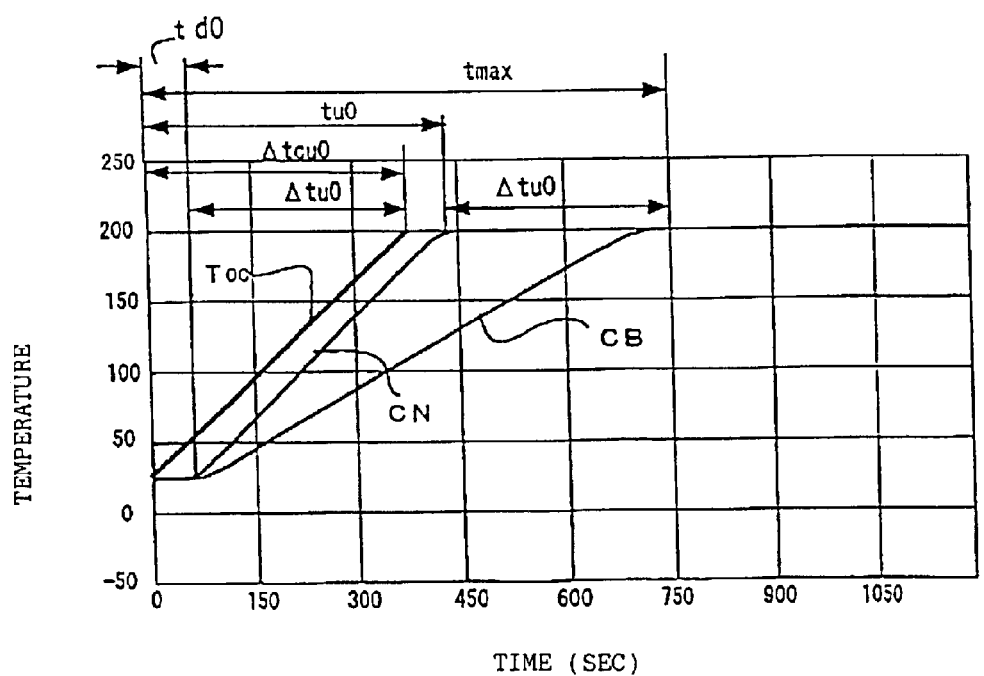
FIG. 8 is a diagram for illustrating the principle of heat-up control according to a second embodiment of the invention.

FIG. 8 is a diagram for illustrating the second embodiment, and shows temperature rise curves for heat zones obtained when the target temperature for PID temperature control is adjusted to 200° C., as in the conventional case, with the actual temperature for the start of heat-up operation and the target preset temperature at 25° C. and 200° C., respectively. Curve CB is a temperature rise curve for a heat zone having the longest heat-up time tmax. Curve CN is a temperature rise curve for the heat zone Z0 of the nozzle portion having a heat-up time tu0. The heat zone Z0 of the nozzle portion is given as a representative of the heat zones Z0, Z1, ... ZN-1. These two curves shares the actual temperature for the start of heat-up operation and the target preset temperature. According to the present embodiment, in this case, the difference Δtun (only Δtu0 is shown in FIG. 8) between the maximum heat-up time tmax and the heat-up time tun of each heat zone are obtained first, and a heat-up control time tcun is obtained by adding the dead time tdn (only td0 is shown in FIG. 8) of the heat zone to the time difference Δtun:

$$\Delta tun = tmax - tun, \quad (4)$$

$$tcun = \Delta tun + tdn. \quad (5)$$

The heat-up temperature command value for each heat zone Zn is linearly changed within the heat-up control time tcun. The heat zone Z0 of the nozzle portion shown in FIG. 8 is given a function of the time represented by straight line T0c as its temperature command. For the heat-up control time tcun, the dead time tdn of the heat zone Zn concerned may be ignored so that the heat-up time difference Δtun is equivalent to the heat-up control time tcun.

In normal temperature control, the temperature command value for each of the heat zones Z0, Z1, ... ZN-1 is a target preset temperature that is much higher than the then actual temperature for the start of heat-up operation. In this case, the temperature deviation for PID temperature control is so great that the switches SW0, SW1, ... SWN-1 are almost always in ON-state, and the heat zones are heated. Temperature rise curves for the heat zones Z0, Z1, ... ZN-1 are represented by the curve CN for the heat zone Z0 of the nozzle portion in FIG. 8, for example. If the temperature command values are values that are dotted along the straight line T0c in the aforesaid manner, however, the temperature deviation is reduced. Therefore, the switch SW0 is turned on or off by PID temperature control, and the speed of temperature rise of the heat zone Z0 lowers. In consequence, the heat zone Z0 reaches the target preset temperature substantially when the maximum heat-up time tmax has elapsed.

For the heat zones that require the maximum heat-up time tmax represented by the curve CB, the time difference is "0", so that a straight line corresponding to the straight line T0c is a vertical line, and the preset temperature (200° C.) is ordered immediately after the start of heat-up operation. In this case, as in the conventional case, the temperature rise curve resembles the curve CB shown in FIG. 8.

Figure 9:
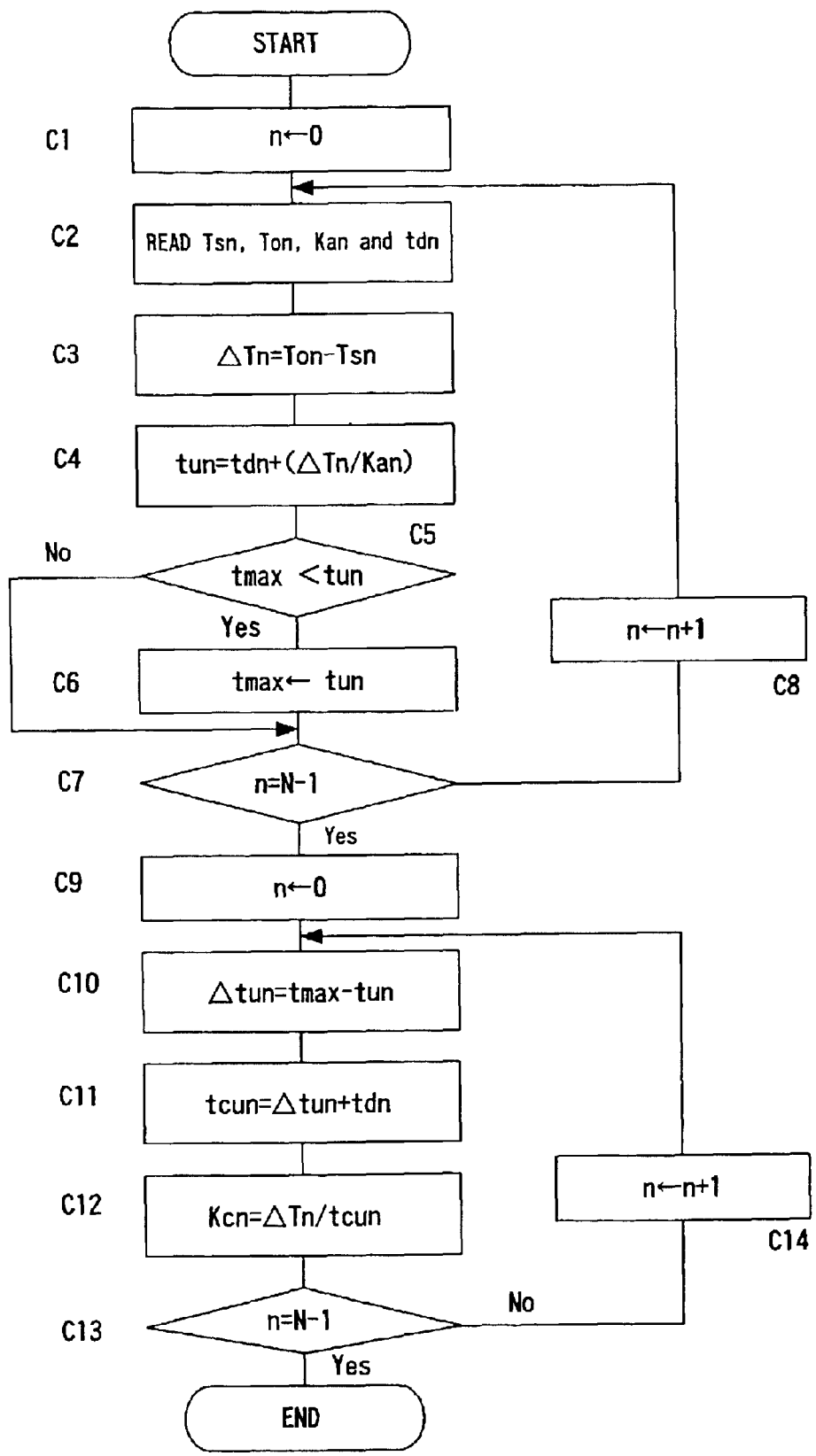
FIG. 9 is a flowchart showing processing for obtaining the control temperature change rate for the heat-up control according to the second embodiment.

FIG. 9 shows processing for obtaining the temperature change rate Kcn for control when the preset temperatures To0, To1, ... ToN-1 are set for the individual heat zones Z0, Z1, ... ZN-1 in carrying out the second embodiment. The control temperature change rate Kcn defines the inclination of a straight line that represent a temperature command value for each of the heat zones Z0, Z1, ... ZN-1, e.g., T0c of FIG. 8.

The processes of Steps C1 to C8 resemble the processes of Steps A1 to A8 shown in FIG. 5. The difference lies in that the obtained heat-up time tun is stored in Step C4 that corresponds to Step A4, though it is not in Step A4. The processes of the other steps are identical.

After the temperature difference ΔTn, heat-up time tun and maximum heat-up time tmax for each heat zone Zn is obtained in the processes of Steps C1 to C8, the index n is set to "0" (Step C9), and the heat-up time difference Δtun is obtained by executing the computation of expression (4) according to the heat-up time tun and the maximum heat-up time tmax for the heat zone Zn indicated by the index n (Step C10). Further, the computation of expression (5) is executed so that the heat-up control time tcun is obtained by adding the dead time tdn to the heat-up time difference Δtun (Step C11).

Then, the temperature difference ΔTn for the heat zone Zn indicated by the index n is read, and the control temperature change rate Kcn for the heat zone Zn is obtained by dividing the temperature difference ΔTn by the heat-up control time tcun and stored in the table TB (Step C12). Whether or not the maximum value N-1 for the number of heat zones is reached by the index n is determined (Step C13). If the maximum value is not reached, the index n is incremented by "1" (Step C14), and the processes of Steps C10 to C14 are repeatedly executed so that the index n reaches the maximum value N-1 for the number of heat zones, whereupon this processing is finished. Thus, the control temperature change rates Kc0, Kc1, ... KcN-1 are stored in the table TB for each of the heat zones Z0, Z1, ... ZN-1, as shown in FIG. 3.

Figure 10:
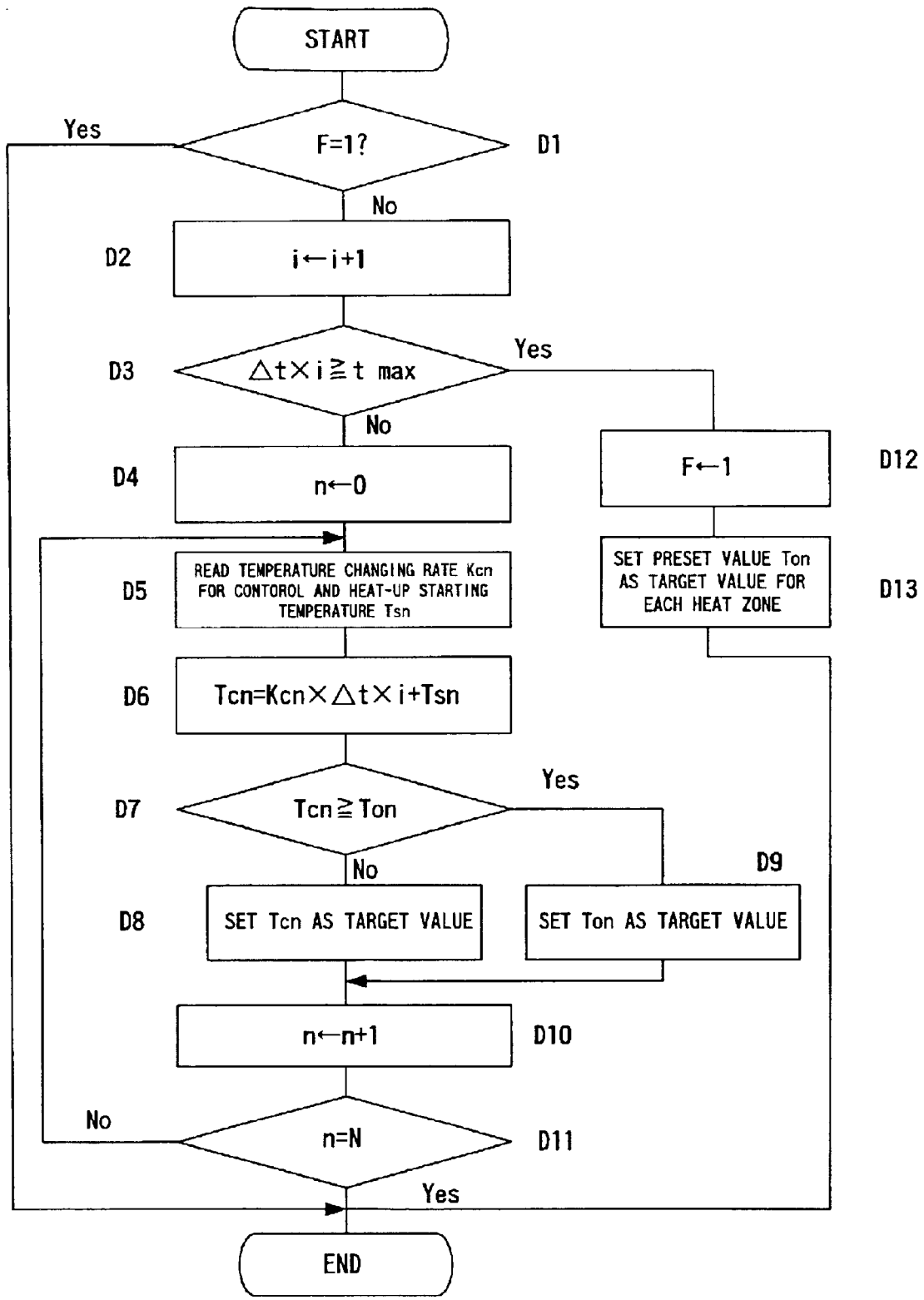
FIG. 10 is a flowchart showing processing for setting a target command value for PID temperature control for the heat-up control according to the second embodiment.

FIG. 10 is a flowchart showing processing for obtaining a command value for heat-up temperature control according to the second embodiment.

The processing shown in FIG. 10 is substantially the same as the processing shown in FIG. 6. There is only a small difference in the timing for setting preset values as target values for PID temperature control.

The processes of Steps D1 to D6 are identical with the processes of Steps B1 to B6 shown in FIG. 6. In this embodiment, whether or not the target temperature Tcn obtained in Step D6 is not lower than the target preset temperature Ton for the heat zone Zn concerned is determined (Step D7). If it is lower than the target preset temperature Ton, the target temperature Tcn obtained in Step D6 is set as the target value for PID temperature control (Step D8). If it is not lower than the target preset temperature Ton, the target preset temperature Ton is set as the target value for PID temperature control (Step D9).

Then, the index n is incremented by "1" (Step D10). If the index n is smaller than the number N of heat zones (Step D11), the processes of Steps D5 to D11 are executed repeatedly, and target values for PID temperature control are set for the heat zones Z0, Z1, ... ZN-1, individually, whereupon the processing for the present period is finished.

If it is detected that the time (Δtxi) elapsed after the start of heat-up operation is not shorter than the maximum heat-up time tmax (Step D3), the flag F is set at "1" (Step D12), and the target values for PID temperature control for the heat zones Z0, Z1, ... ZN-1 are adjusted to the preset value Ton (Step D13), whereupon the processing for the present processing period is finished. Although the process of Step D13 is described in brief, it is equivalent to the processes of Steps B10 to B14 of FIG. 6.

Since the flag F is set to "1" in the next and subsequent periods, moreover, the target values are not rewritten, and the PID temperature control is executed with the preset temperatures To0, To1, . . . ToN−1 instructed as target values for the heat zones Z0, Z1, . . . ZN−1.

In the second embodiment, the target values (command values) for heat-up operation are also changed along the straight line Toc in the manner shown in FIG. 8. Alternatively, however, the target or command values may be changed along a curve, as in the case of the first embodiment shown in FIG. 7.

What is claimed is:

1. A temperature control method for an injection molding machine which has a plurality of heat zones, comprising:
   obtaining a rate of temperature change for each heat zone based on a time required to heat-up from a first temperature to a second temperature with a heater kept in an ON-state, and a difference between the first and second temperatures;
   obtaining a heat-up time from the obtained rate of temperature change for each heat zone and the difference between a preset temperature and the actual temperature of each heat zone;
   extracting a heat zone requiring the longest heat-up time from among the plurality of heat zones for which the heat-up times have been obtained; and
   obtaining a heat-up straight line in accordance with the heat-up time of the extracted heat zone, and controlling the heat-up of each heat zone in accordance with the obtained heat-up straight line.

2. A temperature control method for an injection molding machine which has a plurality of heat zones, comprising:
   obtaining a rate of temperature change for each heat zone based on a time required to heat-up from a first temperature to a second temperature with a heater kept in an ON-state and a difference between the first and second temperatures;
   obtaining a time required from a start of the heat-up operation to an actual start of heat-up;
   obtaining a heat-up time from the stored rate of temperature change of each heat zone and the difference between a preset temperature and the actual temperature of each heat zone and also the stored time required from the start of the heat-up operation to the actual start of heat-up;
   extracting a heat zone requiring the longest heat up time from among the plurality of heat zones; and
   obtaining a heat-up straight line in accordance with the heat-up time of the extracted heat zone, and controlling the heat-up of each heat zone in accordance with the obtained heat-up straight line.

3. A temperature control method for an injection molding machine having a plurality of heat zones, comprising:
   obtaining a temperature change rate for each heat zone based on a time required to heat up from a first temperature to a second temperature, and a difference between the first and second temperatures;
   obtaining a heat-up time from the obtained temperature change rate for each heat zone and the difference between a preset temperature and the actual temperature of each heat zone;
   determining the heat zone requiring the longest heat-up time;
   obtaining a straight line heat-up characteristic based on the heat up time of the extracted heat zone; and
   controlling the heat-up of each heat zone in accordance with the obtained straight line heat up.

4. A temperature control apparatus for an injection molding machine which has a plurality of heat zones, comprising:
   means for obtaining and storing a rate of temperature change for each heat zone based on a time required to heat-up from a first temperature to a second temperature with a heater kept in an ON-state, and a difference between the first and second temperatures;
   means for obtaining a heat-up time from the stored rate of temperature change of each heat zone and the difference between a preset temperature and the actual temperature of each heat zone;
   means for extracting a heat zone requiring the longest heat-up time from among the plurality of heat zones; and
   means for obtaining a heat-up straight line in accordance with the heat-up time of the extracted heat zone, and controlling the heat-up of each heat zone in accordance with the obtained heat-up straight line.

5. A temperature control apparatus for an injection molding machine which has a plurality of heat zones, comprising:
   means for obtaining and storing a rate of temperature change for each heat zone based on a time required to heat-up from a first temperature to a second temperature with a heater kept in an ON-state and a difference between the first and second temperatures;
   means for obtaining and storing a time required from a start of the heat-up operation to an actual start of heat-up;
   means for obtaining a heat-up time from the stored rate of temperature change of each heat zone, the difference between a preset temperature and the actual temperature of each heat zone, and the time required from the start of the heat-up operation to the actual start of heat-up;
   means for extracting a heat zone requiring the longest heat-up time from among the plurality of heat zones; and
   means for obtaining a heat-up straight line in accordance with the heat-up time of the extracted heat zone, and controlling the heat-up of each heat zone in accordance with the obtained heat-up straight line.

* * * * *

UNITED STATES PATENT AND TRADEMARK OFFICE
CERTIFICATE OF CORRECTION

PATENT NO. : 6,861,018 B2
DATED : March 1, 2005
INVENTOR(S) : Hideki Koyama et al.

It is certified that error appears in the above-identified patent and that said Letters Patent is hereby corrected as shown below:

Title page, Item [54] and Column 1, line 3,
Title, delete "STRUCTURE" and insert -- MACHINE --.

Column 4,
Line 13, after "interfaces" delete "-".

Column 10,
Line 35, delete "N-1for" and insert -- N1 for --.

Column 11,
Lines 49 and 58, delete "heat up" and insert -- heat-up --.

Column 12,
Line 10, delete "heat up" and insert -- heat-up --.

Signed and Sealed this

Twenty-fourth Day of January, 2006

JON W. DUDAS
*Director of the United States Patent and Trademark Office*